May 24, 1955

G. R. SUTHERLAND 2,708,822

SIDE-DELIVERY RAKE

Original Filed Sept. 17, 1952

INVENTOR.
GAIL R. SUTHERLAND

BY

ATTORNEYS

May 24, 1955 G. R. SUTHERLAND 2,708,822
SIDE-DELIVERY RAKE
Original Filed Sept. 17, 1952 3 Sheets-Sheet 2

INVENTOR.
GAIL R. SUTHERLAND
BY
ATTORNEYS

May 24, 1955

G. R. SUTHERLAND 2,708,822

SIDE-DELIVERY RAKE

Original Filed Sept. 17, 1952

INVENTOR.
GAIL R. SUTHERLAND

BY

ATTORNEYS

United States Patent Office 2,708,822
Patented May 24, 1955

2,708,822

SIDE-DELIVERY RAKE

Gail R. Sutherland, Ottumwa, Iowa, assignor to Deere Manufacturing Co., Dubuque, Iowa, a corporation of Iowa Continuation of application Serial No. 309,963, September 17, 1952. This application May 21, 1953, Serial No. 356,521

14 Claims. (Cl. 56—377)

This application is a continuation of application Ser. No. 309,963, filed September 17, 1952, now abandoned, and the invention relates to a vehicle and more particularly to an agricultural vehicle of the type commonly known as a side-delivery rake. Still more particularly, the invention relates to means for removably mounting one or more wheels on a vehicle and particularly on a side-delivery rake.

The conventional side-delivery rake comprises a longitudinal main frame having front and rear ends. This main frame is wheel-supported, normally at both ends; although, in many instances the forward end is supported directly on the draft member of a tractor or similar propelling vehicle and the rear end is carried on its own wheels, which may number one or more. The present invention pertains particularly to a side-delivery rake of the type just referred to; that is, one in which the rear end is carried on its own wheels and the forward end is supported on a wheeled draft vehicle.

In the design of a side-delivery rake, many things must be taken into consideration, such as the stability of the rake and the ability of the machine to operate over fields of various types and on which various crops are grown. Accordingly, the transverse or axial spacing of the rear ground wheels becomes important. The relationship of these wheels to the windrow being raked is also important, since it is desired to avoid running over a windrow already formed. In some instances, the rake will be used in raking certain row crops such as row-planted beans. If the wheels are too closely spaced, they will interfere with the spacing of the rows. If they are too widely spaced, the left-hand wheel is apt to run over the windrow (it being conventional to discharge or form the windrow to the left side of the machine as the machine advances).

Another factor important in determining the relationship between the wheel spacing and the rake reel itself is based on the desirability of driving the rake reel from the axle on which the wheels are journaled. Heretofore, the relationship between the wheels and rake reel is such that a relatively elongated drive has been necessary to transfer the output power of the wheels to the forward end of the rake reel. According to the present invention, this disadvantage is avoided by the utilization of a relatively short drive shaft between drive mechanism at the left-hand rear wheel and the left-hand rear end of the rake reel. This novel result is made possible by locating the left-hand wheel inwardly rather than outwardly of the left-hand side of the main frame. Accordingly, the input shaft for the rake reel can be substantially in longitudinal alinement with an output shaft projecting from the drive mechanism located outwardly of the left-hand side of the main frame.

It is an important object, especially in connection with the arrangement described above, to provide means for facilitating the removal of the left-hand rear wheel. Since it is a feature of the invention to rigidly affix a drive mechanism or gear housing outside the left-hand frame member and to locate the left-hand wheel inwardly of the left-hand frame member, it would be difficult to remove the left-hand wheel without removing the entire wheeled axle assembly. This disadvantage is obviated by the provision of an axle structure comprising disconnectible axle elements having proximate ends forming a joint intermediate the left-hand wheel and the right-hand frame member, whereby the axle elements may be easily disassembled and the left-hand wheel removed. A further feature in this respect is the demountable carrying means for the left-hand wheel, which includes a wheel mount having wheel-receiving means facing toward the junction of the axle elements so that the wheel may be removed from the wheel mount and moved axially inwardly along the axle. Since the inner or proximate ends of the axle elements can be separated, the space provided by separation of these inner ends accommodates removal of the wheel as it is slipped off the end of the axle.

The foregoing and other important objects and desirable features inherent in and encompassed by the invention will become apparent as a complete disclosure is made of a preferred embodiment of the rake with two embodiments of the improved wheeled axle assembly.

The rake or vehicle comprises a longitudinal main frame 20 having front and rear ends 22 and 24 and first and second longitudinal side members 25 and 26. Throughout this description, reference will be had to the rake or vehicle as having right- and left-hand sides. These expressions will be used as the parts are seen by an observer standing behind the machine and looking forwardly. The terminology will accord with the position of the rake in Figure 1. The direction of travel of the machine is indicated by the designation of the front end of the frame 20 by the numeral 22.

Figure 5:
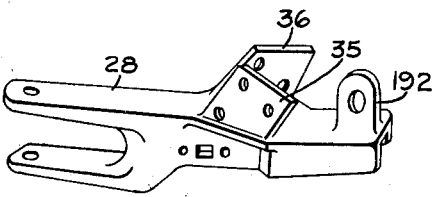
Figure 5 is a view of a combined hitch and frame member joining element.

The main frame 20, as viewed from above, is in the form of a substantially isosceles triangle having its peak or apex at 22. The side frame members 25 and 26 are rigidly interconnected by being joined to a casting in the form of a hitch element 28 which has an aperture 30 therein for receiving a hitch pin 32 by means of which the rake may be supported on and connected to the drawbar (as at 34 in Figure 3) of a tractor or similar vehicle. As shown in Figure 5, the element 28 has left- and right-hand flanges 35 and 36 rigid thereon for connection respectively to the forward ends of the side frame members 25 and 26. As indicated generally in Figure 3, a plurality of bolts 37 may be utilized for effecting the connection.

Figure 4:
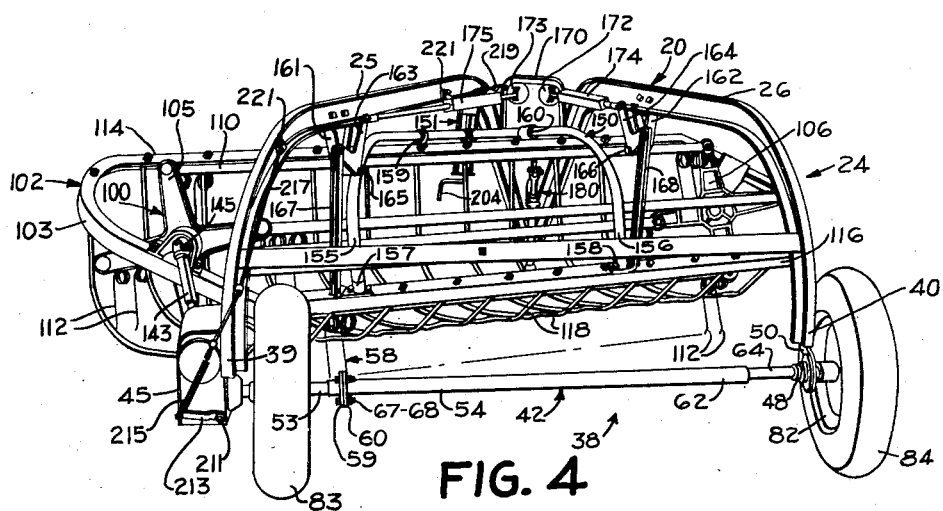
Figure 4 is a rear perspective view of the machine.

The rear end of the main frame 20 is supported on or sustained by a wheeled axle means designated generally by the numeral 38. The support of the main frame 20 on the wheeled axle means 38 is effected through the medium of the side frame members 25 and 26. As best seen in Figure 4, the side frame member 25 has a rear end portion curved downwardly to form a first support 39. The rear end portion of the right-hand frame member 26 is similarly formed to establish a second support 40. These supports are transversely spaced and alined slightly above the axis of the wheel and axle means 38.

The axle means includes an elongated axle structure 42 having first and second or left-hand and right-hand opposite ends 43 and 44. These ends project respectively laterally outwardly of the side frame member supports 39 and 40. As used herein, the expression "outwardly" means to the left of the left-hand side member or the right of the right-hand side member; conversely, the expression "inwardly" means in the opposite direction from each of the side members.

A drive mechanism housing means 45 is rigidly but removably affixed to the left-hand support 39, a pair of cap screws 47 being illustrated as representative securing means. This housing means encloses the first or left-hand end 43 of the axle structure 42 and is provided with a pair of laterally spaced bearings 49 and 51 which establish bearing means for journaling the left-hand end of the axle structure. The right-hand end of the axle structure 42 is journaled in a bearing 48 forming part of bracket means 50 rigidly but removably affixed as by bolts 52 to the right-hand or second support 40.

The axle structure 42 comprises first and second axle elements 53 and 54 respectively. The element 53 is at the left-hand side of the machine and is in the form of a relatively short stub axle, its outer end being journaled in the bearing means 49—51 in the housing 45 as previously described. The right-hand or inner end of the stub axle 53 projects (Figure 7) inwardly of the left-hand support 39 to an inner end portion 55. In that form of the invention disclosed in Figures 1 through 8, the right-hand or second axle element is quite a bit longer than the stub axle 53. As previously described, the outer or right-hand end 44 of the axle element 54 is journaled in the bearing 48 of the bracket means 50. The right-hand axle element has an inner end 56 normally disposed in close proximity to the inner end 55 of the left-hand stub axle 53. Coupling means, designated generally by the numeral 58, is selectively effective to establish connection or disconnection between the axle element inner ends 55 and 56. In this form of the invention, the coupling means 58 comprises a left-hand coupling portion or part 59 splined and pinned or otherwise fixed to the inner end 55 of the stub axle 53 and a right-hand coupling portion or part 60 here forming part of a sleeve 62 coaxial with a solid axle part 64 of the right-hand axle element 54. The sleeve 62 may be welded, as at 66, to the solid axle part 64. The coupling portions or parts 59 and 60 are here in the form of circular flanges having registering circles of bolt holes for receiving a plurality of bolts to join the coupling parts together. One such bolt is designated by the numeral 67 in Figure 7 and is shown as having a removable nut 68 so that the bolts may be removed. This is merely representative of one form of securing means that could be utilized to join the coupling parts or flanges 59 and 60 together. When the flanges are joined, the axle parts 53 and 54 rotate in unison, being journaled by the bearing means 49—51 and 48, previously described.

The stub axle 53 has thereon, intermediate the support 39 and the stub axle inner end 55, a wheel-receiving means or mount 69. This mount is in the form of a hub rotatable relative to the axle part 53 and constrained against axial movement in one direction by a plurality of washers 71 and a pin 73. The hub or wheel mount 69 is restrained against axial movement in the opposite direction (to the left) by what may be termed an intermittently rotating clutch member 75 that is pinned to the stub axle 53 by a pair of pins 77. The interior of the intermittently rotating clutch member 75 and the interior of the hub 69 cooperate to provide an overrunning clutch designated generally by the numeral 79. Since overrunning clutches of this type are conventional in side-delivery rakes and other implements, detailed description thereof will be omitted. Suffice it to say that the hub 69 serves as means for the mounting of a demountable left-hand or first wheel 81 on which is carried a pneumatic tire 83. The tire runs on the ground and accordingly the wheel 81 rotates as the machine moves forwardly. The overrunning clutch mechanism 79 is such that the hub 69 drives the intermittently rotating clutch part 75 which in turn imparts rotation to the stub axle 53. A similar overrunning clutch means (not shown) constitutes drive means between the outer end 44 of the right-hand axle element 54 and a right-hand ground wheel 82 which is also equipped with a pneumatic tire 84. When the machine is operating straight ahead, both ground wheels 81 and 82 will impart power to rotate the axle structure 42. On the right-hand turns, the left-hand wheel will overrun the right-hand wheel and the overrunning clutch mechanism in the right-hand wheel will accommodate the overrunning. The converse is true on left-hand turns. Broadly, the arrangement is not unconventional and it is deemed that further description is unnecessary.

The wheel 81 is of the demountable type having a central mounting opening 85 received by a wheel-receiving portion 87 of the wheel mount 69. Part of the wheel-receiving portion comprises a circle of mounting studs 89 that face or project toward the inner end 55 of the stub axle 53. That portion of the wheel 81 that surrounds the central mounting opening 85, as is conventional in automotive type wheels, has a circle of stud-receiving apertures 91, and a plurality of nuts 93 cooperate with the studs 89 to demountably carry the wheel 81 on the wheel mount 69. The diameter of the central opening 85 in the wheel 81 is greater than the diameter of at least the inner coupling flange 59, for purposes to presently appear.

Inasmuch as the gear housing means 45 is carried outwardly of the left-hand support 39 and the wheel 81 is inwardly of this support, it would appear to be difficult to remove the wheel 81 without removing the entire wheeled axle assembly 38. However, this is not the case, because of the novel features provided by the present invention, primarily residing in the disconnectible coupling 58. The axle structure 42 has provision for relative movement of the inner ends 55 and 56 of the axle elements 53 and 54 when the coupling means 58 is disconnected. In the form of the invention shown particularly in Figure 7, this provision for relative movement of the inner ends as aforesaid flows from the nature of the bearing 48 for the right-hand end 44 of the axle structure. As illustrated, the bearing 48 is of the self-alining type and affords considerable flexibility to the axle structure 42 in the sense that opposite ends thereof will always be in perfect alinement regardless of slight errors in alinement of the bracket means 50 with the housing means 45. In the particular form of bearing shown, the bearing is of the ball type having an outer race 94 the outer surface of which is the section of a sphere. The bearing is retained in the bearing means by inner and outer flanges 96 which establish annular inner surfaces cooperatively spherical in shape so that the bearing 48 is rockable in the flanges and consequently in the bracket means 50 in a direction such that the inner end 56 of the right-hand axle element may, when the coupling 58 is disconnected, swing or move in a direction transverse to the axis of the axle structure.

Figure 8:
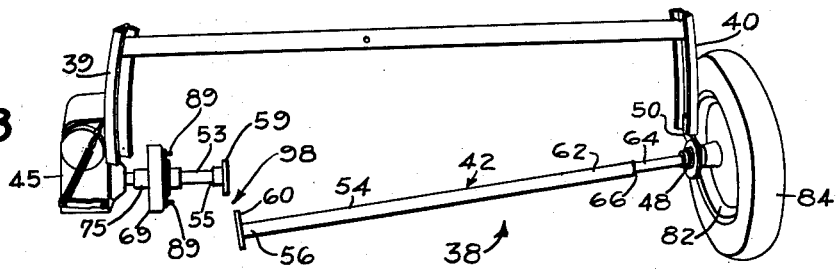
Figure 8 is a fragmentary rear perspective view showing one form of means providing for separation of the inner ends of the axle elements so that the left-hand wheel may be removed.

The above result is best brought out in Figure 8, wherein the coupling 58 is shown as being disconnected so that the flanges 59 and 60 are separated. The separation between the flanges is such as to establish a wheel-accommodating space 98 between the inner ends 55 and 56 of the axle elements 53 and 54. As previously stated, the wheel-demounting means 89 faces toward the inner end 55 of the stub axle 53. Accordingly, the wheel 81 may be removed in an axial inward direction. Since the wheel mounting opening 85 is of greater diameter than that of the left-hand coupling flange 59, the wheel may pass easily over the flange and off of the inner end of the stub axle and may be removed readily through the wheel-accommodating space 98. Thus, it is not necessary to disconnect either the housing means 45 or the right-hand bearing and bracket means 48—50 in order to remove the left-hand wheel. Since the right-hand wheel is outside the right-hand support 40, a similar problem is not presented. However, if the right-hand wheel were located inwardly of the right-hand support 40, it could likewise be removed in the same manner as the left-hand wheel. In order that the left-hand wheel need not be moved a relatively great distance along the axle structure, the coupling means 58 establishes a joint between the coupling flanges 59 and 60 at a location relatively close to the left-hand wheel. Of course, the parts could be reversed and the same results achieved.

The rake includes as a component part thereof a rotatable rake reel designated generally by the numeral 100 and carried by a reel frame or basket designated generally by the numeral 102. The reel and basket are disposed as a unit diagonally relative to the main frame 20 so that the first or left-hand end of the basket, bearing the numeral 103, is closely spaced just ahead of the gear housing means 45 and so that the right-hand end, bearing the numeral 104, is somewhat remote longitudinally from but in substantially longitudinal alinement with the right-hand wheel 82.

The reel itself comprises left- and right-hand rotatable spiders 105 and 106 respectively journaled in bearings 107 and 108 respectively at the ends 103 and 104 of the basket 102. The spiders are interconnected by a plurality of rake bars 110, each of which is equipped with a plurality of conventional rake teeth 112. The basket 102 has a forward or leading edge or frame member 114 and a rear or trailing frame member 116. A plurality of stripper bars 118 cross-connect the frame members 114 and 116 and lie generally parallel to the planes through which the rake teeth 112 move as the reel 100 rotates. The rear portions of the stripper bars 118 are offset, as designated by the numeral 120, for purposes of affording increased clearance for the cooperative rake teeth 112.

In addition to enclosing the outer or left-hand end 43 of the axle structure 42, the housing means 45 encloses drive mechanism designated generally by the numeral 121. This drive mechanism includes an externally splined sleeve 123 pinned at 125 to the end 43 of the stub axle 53. A worm wheel 127 is journaled on an unsplined portion of the sleeve 123 and consequently is at times rotatable relative to the axle structure 42. The right-hand face of the worm wheel 125 has a clutch part 129 which cooperates with a clutch part 131 carried for axial shifting by the splined sleeve 123. A spring 133 acts between an interior wall 135 of the housing means 45 and the clutch part 131 to urge the clutch part into engagement with the clutch member or part 129 formed on the worm wheel 127. Thus, as long as the disconnectible clutch means 129—131 is engaged under action of the spring 133, the axle structure 42 will rotate the worm wheel 127.

Figures 1, 2:
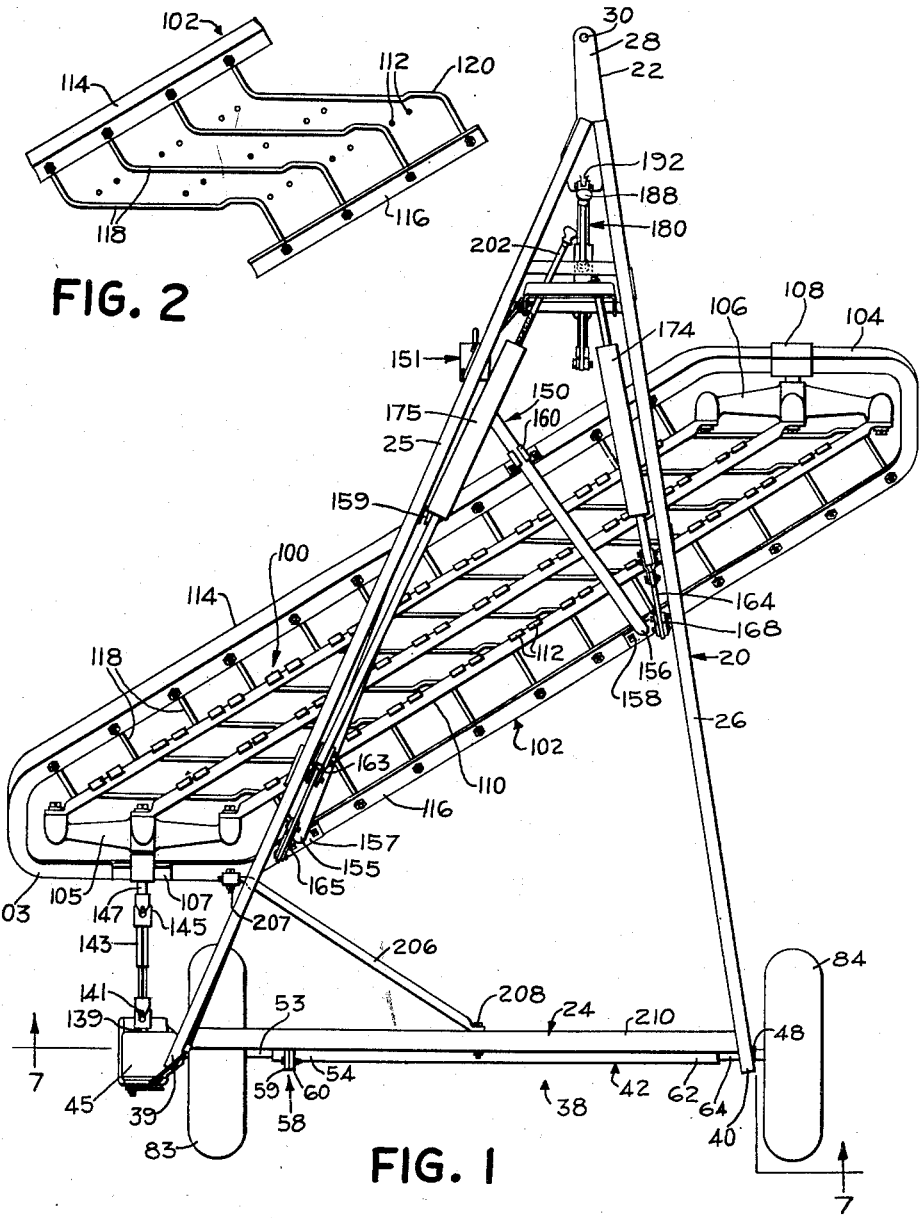
Figure 1 is a plan view of a rake of the general character described above.
Figure 2 is a fragmentary plan view showing part of the reel basket and the relationship thereto of the stripper members for stripping the crop from the rake teeth.

This worm wheel is in constant mesh with a worm 137 that is keyed to a driving or output shaft 139. As best shown in Figure 1, the forward end of the output shaft 139 projects exteriorly of the housing means 45 and is equipped with a universal joint connection 141 to a telescoping drive means or shaft assembly 143 which is in turn connected by a second universal joint 145 to an input shaft 147 keyed to the left-hand spider 105 of the rake reel 100. As a result, the rake reel is driven at its rear end from the ground drive means established by the wheeled axle assembly 38. The driving connection between the axle assembly and the rake reel is relatively short, since it is connected directly to the rear or proximate end of the reel rather than to the forward end, in which latter case a relatively long drive shaft would be required. Hence, not only does the location of the wheel inside the left-hand frame member 25 enable location of the housing means 45 outside the left-hand frame member, which in itself accommodates a desirable wheel spacing or tread between the wheels 81 and 82, but the specific location of the gear housing permits the use of a short direct drive to the reel. In this respect, it is a feature of the invention that the housing means 45 is rigidly but removably mounted on the outer side of the support 39 and is thus readily available for inspection and servicing without disturbing the left-hand wheel 81. For this purpose, the outer face of the housing is enclosed by a removable closure 149 normally held in place as by a plurality of cap screws 151.

The reel frame or basket 102 is supported or suspended from the main frame 20 by means of a V-shaped subframe 150 having a three-point connection to the main frame.

The forward end of the subframe is carried by a combined adjustable and pivotal support 151 which includes, among other things, a pivot on a transverse axis at 153. The subframe has rear end portions 155 and 156 connected by suitable attaching brackets 157 and 158 respectively to the rear or trailing frame member 116 of the reel basket 102. Intermediate portions of the subframe are connected at 159 and 160 to the leading edge 114 of the reel basket. Thus, the subframe is a component part of the reel basket.

The left-hand frame member 25 of the main frame has a depending bracket 161 on which a bell crank 163 is rockable on a pivot axis at 165. A similar bracket 162 is carried by the right-hand main frame side member 26 to support a bell crank 164 for rocking about a transverse pivot axis at 166. The rearwardly extending arms of the bell cranks 163 and 164 are respectively connected by suspension links 167 and 168 to the brackets 157 and 158 that respectively secure the rear ends 155 and 156 of the subframe 150 to the rear or trailing edge 116 of the reel basket 102. Consequently, rocking of the bell cranks respectively on their pivot axes 165 and 166 will cause the rear end of the subframe—and with it the reel basket—to rise or fall about the horizontal transverse pivot axis 153 in the front support 151.

Figure 3:
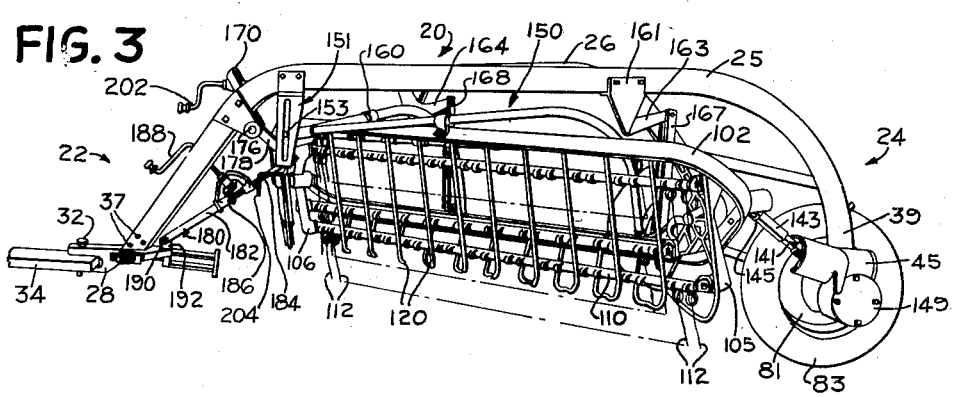
Figure 3 is a left-hand perspective view of the machine.

The bell cranks 163 and 164 may be rocked simultaneously by means of a main control member 170 having left- and right-hand connection portions 171 and 172 with rearwardly extending operating linkages 174 and 175 connected respectively to the bell cranks 164 and 163. As best shown in Figure 3, the main control member 170 is in the form of a plate rockable about a transverse horizontal axis at 176. The axis 176 is established by a transverse rockshaft to which the plate 170 is welded. An operating arm 178 is likewise welded to the rockshaft at 176 and extends downwardly and rearwardly to a point at which its free end is connectible to suitable power-transmitting devices. In Figure 3, one such device is designated generally by the numeral 180 as comprising internally and externally threaded members 182 and 184 adapted to extend or contract under the influence of a pair of meshing bevel pinions 186 powered manually via an adjusting crank 188. The member 182 of the device 180 is anchored at 190 to an upstanding ear 192 on the hitch element 28 (Figures 3 and 5).

Figure 6:
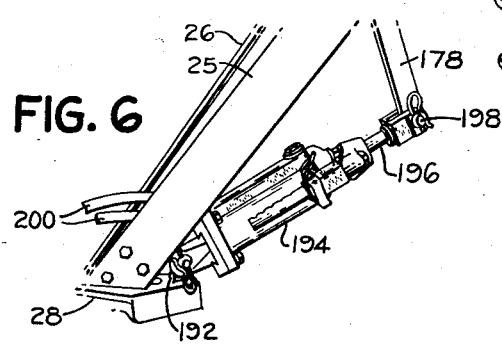
Figure 6 is a fragmentary view of a forward portion of the rake showing an alternate device for adjusting the rake reel relative to the main frame.

In lieu of the device 180, a hydraulic motor may be used as suggested in Figure 6. This motor comprises a cylinder 194 and a piston having a piston rod 196. The cylinder is anchored to the ear 192 on the hitch element 28 and the free end of the piston 196 is disconnectibly connected at 198 to the free end of the main control member actuating arm 178. Hoses 200 are indicated in Figure 6 as representative means for supplying fluid to and conveying fluid from the cylinder 194, it being understood that the conventional agricultural tractor with which the rake will most likely be used is equipped with a fluid power system of the type including a hydraulic motor as one component thereof for operating remote implements.

An adjusting crank 202 is illustrated in Figures 1 and 3. This is for the purpose of adjusting the left-hand linkage 175 to raise or lower the left-hand end of the subframe relative to the right-hand end or side of the subframe.

The front support 151 includes provision for adjustability and a crank 204 is provided for that purpose. These details are likewise of no significance in this case.

Because of the flexible mounting of the subframe on the front support 151 and the bell crank suspension means 163 and 164, the reel and basket 100 and 102 could have undesirable lateral movement except for the provision of stabilizer means 206 pivoted at its left-hand end at 207 to the left-hand end of the reel basket 102 and pivoted at its right-hand end at 208 to a transverse tie bar 210 that cross-connects the rear supports 39 and 40 of the main frame 20. The stabilizer 206 is a rigid member and thus prevents lateral displacement of the reel and basket relative to the main frame. At the same time, the pivotal connections at 207 and 208 permit rise and fall of the reel and basket relative to the main frame to accommodate adjustment or to permit the subframe and reel and basket to rise in the event that an obstacle or sharp upward slope in ground contour is encountered.

The clutch 129—131 for the drive mechanism 121 was previously described as being maintained in engagement by the clutch-loading spring 133. For the purpose of disengaging the clutch when desired, a clutch-operating member 209, in the form of a conventional fork that embraces the shiftable clutch member 131, is keyed to a rockshaft 211 that projects rearwardly and exteriorly of the housing means 45. To the exterior end of the rockshaft 211 is keyed an operating arm 213 and the free end of this arm is connected by means of a short tension spring 215 to an actuating means in the form of a cable 217 that extends forwardly to a connection at 219 with the main control member 170. The cable 217 is appropriately guided by grommets or clips 221 carried at the inner face of the left-hand frame member 25. The tension in the spring 215 is such that the main control member 170 must be rocked to its maximum forward position before the clutch 129—131 will be disengaged. This maximum forward movement of the main control member 170 is consistent with the raised or transport position of the basket and reel, during which position it is, of course, desired that the drive to the reel be disconnected. Consequently, there is provided means responsive to raising of the reel to transport position for disengaging the drive mechanism between the axle structure 42 and the rotatable reel 100.

Figure 9:
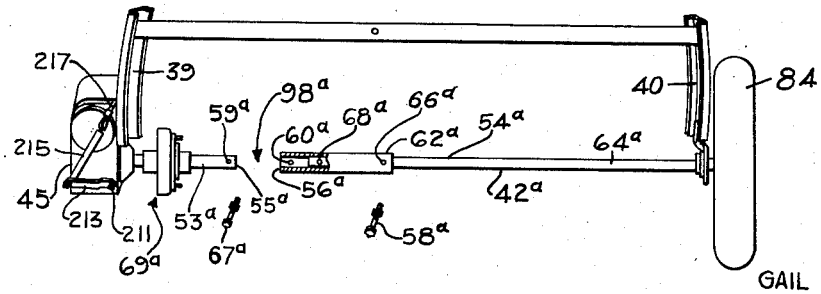
Figure 9 is a view of a modified form of the structure shown in Figure 8.

In the modified form of wheeled axle assembly shown in Figure 9, reference characters heretofore used will be employed to designate corresponding parts. To the extent that the parts are somewhat different from those previously described, the same reference characters will be used but will be suffixed by the exponent "a."

Figure 7:
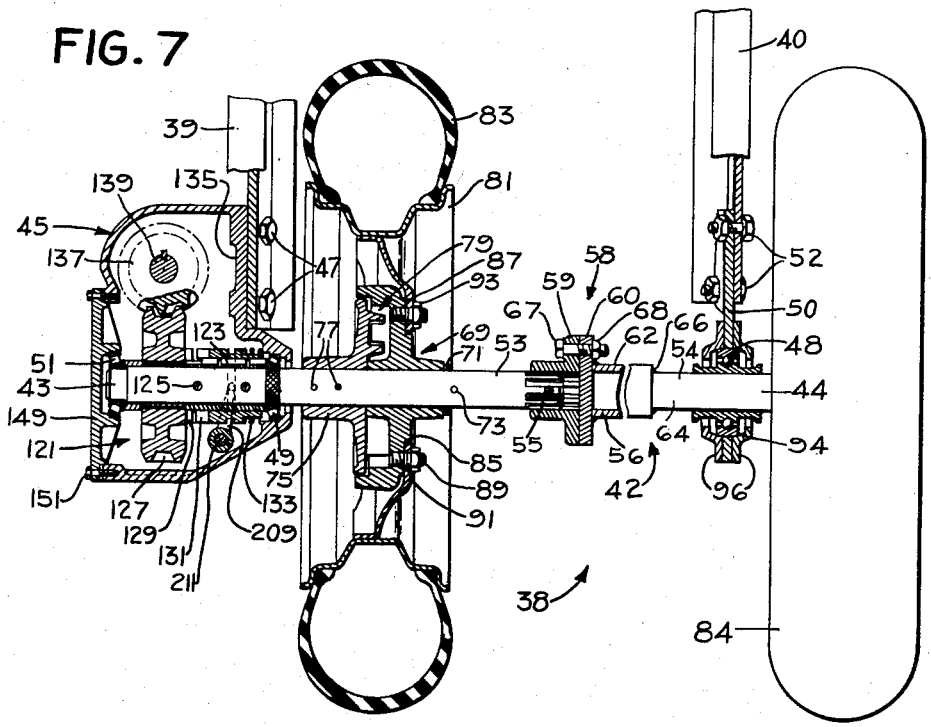
Figure 7 is an enlarged fragmentary sectional view taken substantially on the line 7—7 of Figure 1, with an intermediate portion of the axle structure omitted to enable the use of a larger scale in the drawing.

On the basis of the description of the wheeled axle assembly shown particularly in Figures 7 and 8, the description of Figure 9 may be made relatively brief. It will be noted that the modified form of axle assembly comprises an axle structure 42a made up of left- and right-hand axle elements 53a and 54a. The axle element 53a has a wheel mount 69a, the details of which may be the same as those previously described. The free or inner end 55a of the axle 53a has a cross bore or aperture 59a.

The right-hand axle element 54a comprises a pair of relatively axially movable or telescopic parts 62a and 64a, as distinguished from the welded parts 62 and 64 of the axle structure 42. The inner end of the telescoping part 62a is identified by the numeral 56a, since it cooperates with the inner end 55a of the left-hand axle element 53a when the axle structure is assembled and the left-hand wheel is in place. However, when it is desired to remove the left-hand wheel, the telescoping part 62a may be backed away from the end 55a of the axle element 53a. The end 56a of the telescoping part 62a has a cross bore or aperture 60a therein which is normally in register with the cross bore or aperture 59a in the axle element 53a. Representative securing means is shown at 67a as comprising a nut and bolt assembly 67a. The bolt may be passed through the registered apertures 59a and 60a to tie the sleeve or telescoping part 62a rigidly to the axle part 53a.

The inner end of the axle part 64a of the right-hand axle element 54a has a cross bore or aperture 68a which is normally in register with a cross bore or aperture 66a in the sleeve or telescoping part 62a and the alined apertures are adapted to receive securing means shown here as represented by a bolt and nut assembly 58a. In short, when the axle structure 42a is completely assembled, the sleeve will be to the left of the position shown in Figure 8 so that the opposite ends thereof are pinned to opposite ends of the axle element 53a and axle part 64a. The sleeve 62a and its cooperating parts thus comprise a coupling means corresponding somewhat to the coupling 58 of the modification previously described. In any event, the axle structure 42a broadly includes provision for relative separation of inner end portions of the right- and left-hand axle elements to provide a wheel-accommodating space 98a through which the left-hand wheel may be removed when dismounted from the wheel mount 69a.

It is deemed unnecessary to reiterate the objects and features of the invention as outline at the beginning of this description. Likewise, it is deemed unnecessary to emphasize those specific features that have been pointed out as the description progressed. Further objects and features of the invention, not specifically enumerated here, will undoubtedly occur to those versed in the art, as will numerous modifications and alterations in the preferred embodiments of the invention disclosed, all of which may be achieved without departing from the spirit and scope of the invention.

What is claimed is:

1. A side-delivery rake comprising: a longitudinal main frame having front and rear ends and first and second longitudinal side members having their rear ends transversely spaced apart and alined to form first and second supports; axle means disposed transversely at the rear end of the main frame and having first and second opposite ends projecting respectively laterally outwardly beyond the first and second supports; housing means rigidly affixed to the first support and enclosing and including first bearing means journaling the first end of the axle means; second bearing means secured to the second support and journaling the second end of the axle means; a first ground wheel on the axle means laterally inwardly of and closely adjacent to the first support; a second ground wheel on the axle means adjacent to the second support; first and second means cooperative between the wheels and the axle means for imparting rotation of the wheels to the axle; drive mechanism in the housing means and driven by the first end of the axle means and having an output member projecting forwardly through the housing means; a rotatable rake reel having first and second ends and arranged diagonally of and supported by the main frame with its first end closely ahead of the housing means and its second end longitudinally remote from and ahead of the second wheel; a rotatable input member included in the rake reel at its first end in substantially longitudinal alinement with the output member; and relatively longitudinally short drive means interconnecting the output and input members to drive the rake reel at its rear end from the ground wheels.

2. The invention defined in claim 1, in which: the first wheel is demountably carried by the axle structure; and the axle structure comprises a pair of relatively separable axle elements joined by a selectively connectible and disconnectible coupling intermediate the first wheel and the second support to enable removal of the first wheel from the axle structure without detaching the housing means from the first support.

3. The invention defined in claim 1, in which: the axle structure comprises first and second separate axle elements respectively journaled at their outer ends by the first and second bearing means and having their inner end portions normally closely proximate to each other at a junction intermediate the first wheel and the second support; the first axle element includes wheel mounting means demountably carrying the first wheel for removal from said first axle element in the axial direction toward said junction; said inner end portions respectively include cooperative coupling parts selectively connectible to join said inner end portions for rotation of the axle elements in unison and disconnectible to enable said inner end portions to be separated sufficiently to accommodate removal of the first wheel off of the inner end of said first axle element.

4. The invention defined in claim 1, in which: the axle structure comprises first and second separate axle elements respectively journaled at their outer ends by the first and second bearing means and having their inner end portions normally closely proximate to each other at a junction intermediate the first wheel and the second support; the second bearing means is articulate to enable displacement at times of the second axle element in a direction transverse to the axis of the axle structure so that the inner end portion of the second element may be separated in said transverse direction from the inner end portion of the first axle element; said elements respectively have at their inner ends first and second coupling flanges and means for selectively interconnecting the flanges to join the axle elements or disconnecting the flanges to accommodate the aforesaid separation of said inner end portions; the first element has means for demountably carrying the first wheel, including a wheel-receiving portion facing toward the first flange; and the first wheel has a central mounting opening therein encircling the first axle element and of larger diameter than the first flange so that said first wheel when demounted from the aforesaid wheel-receiving portion may pass inwardly over said first flange for removal between the separated flanges.

5. The invention defined in claim 1, in which: the axle structure comprises first and second separate axle elements respectively journaled at their outer ends by the first and second bearing means and having their inner end portions normally closely proximate to each other at a junction intermediate the first wheel and the second support; the second axle element comprises a pair of relatively movable parts, one of which forms the inner end portion of said second axle element, said one part being displaceable relative to the other part and relative to the inner end portion of the first axle element to provide a wheel-accommodating space at the inner end of said first axle element; said first axle element has wheel-receiving means thereon demountably carrying the first wheel for removal from said first axle element axially toward the inner end portion of said first axle element and transversely of said first axle element through the aforesaid wheel-accommodating space; and coupling means is cooperative between the first axle element and the displaceable axle part for selectively interconnecting or disconnecting said first axle element and displaceable part.

6. The invention defined in claim 1, in which: the drive mechanism includes a selectively connectible and disconnectible clutch means; the rake reel is sustained by the main frame for movement relative to the main frame for raising from an operating position to a transport position; and actuating means is connected between the rake reel and the clutch means for disconnecting the clutch means upon raising of the rake reel to its transport position.

7. An axle assembly for mounting on a vehicle having a pair of supports spaced a fixed distance apart, comprising: first and second separate axle elements respectively having inner and outer ends and arranged in coaxial alinement to form an elongated axle structure having said outer ends spaced apart on the order of the spacing of the vehicle supports and said inner ends normally positioned in close proximity to each other at a junction intermediate the vehicle supports; said axle structure having a pair of separate, axially spaced bracket means thereon, one on each axle element, respectively adjacent to said outer ends for affixation to the respective supports to mount the axle structure on the vehicle; said axle structure including provision, other than removal of the bracket means from the vehicle or from said axle structure, for movement of one of the inner ends relative to the other to space said inner ends apart sufficiently to accommodate therebetween a wheel having a central mounting opening; said axle elements respectively having at their inner ends cooperative coupling portions selectively interconnectible or disconnectible at the aforesaid junction to join or separate said inner ends for respectively preventing or permitting said relative movement of said inner ends of the axle elements; the first axle element and its coupling portion having a transverse dimension less than the diameter of the wheel opening to enable the wheel to be moved selectively axially onto or off of said first axle element when the coupling portions are disconnected and the inner ends of the axle elements are spaced apart as aforesaid; and said first axle element having thereon, intermediate its coupling portion and the proximate bracket means, a wheel mount including wheel-receiving means facing toward the junction of the inner ends of said axle elements for removably carrying the wheel on said one axle element.

8. The invention defined in claim 7, in which: the provision for relative movement of the inner ends of the axle elements comprises a pair of relatively axially movable axle parts making up one of the axle elements, one of the axle parts being constrained against axial movement by the associated bracket means and the other of said axle parts being movable axially away from the inner end of the other axle element to achieve said wheel-accommodating space.

9. The invention defined in claim 7, in which: the provision for relative movement of the inner ends of the axle elements comprises a pair of relatively separable axle parts making up one of the axle elements, one of the axle parts being constrained against axial movement by the associated bracket means and the other of said axle parts being selectively displaceable relative to said one part and relative to the inner end of the other axle element to achieve said wheel accommodating space.

10. The invention defined in claim 7, in which: the provision for relative movement of the inner ends of the axle elements comprises a flexible connection between one axle element and its bracket means providing for movement of said one axle element relative to the associated support and relative to the other axle element in a direction transverse to the axis of the axle structure.

11. An axle assembly for mounting on a vehicle having a pair of supports spaced a fixed distance apart, comprising: first and second separate axle elements respectively having inner and outer ends and arranged in coaxial alinement to form an elongated axle structure having said outer ends spaced apart on the order of the spacing of the vehicle supports and said inner ends normally positioned in close proximity to each other at a junction intermediate the vehicle supports; a pair of bracket means, one on each axle element adjacent to its outer end, for affixation respectively to the supports to mount the axle structure on the vehicle; the bracket means on one axle element including a fixed part connectible to the associated support and a relatively movable part sustaining said one axle element so that the inner end of said one axle element may be displaced relative to the inner end of the other axle element to enable selective spacing of said inner ends sufficiently far apart to receive therebetween a wheel having a central opening; a pair of coupling parts, one on the inner end of each axle element, selectively interconnectible to join said inner ends at the aforesaid junction or disconnectible to achieve said wheel-receiving spacing, one of the coupling parts and its associated axle element having a transverse dimension less than the diameter of the wheel opening to enable axial movement of the wheel selectively onto or off of said associated axle element and over said one coupling part when the coupling parts are disconnected and the axle element inner ends are relatively displaced; and a wheel mount on said associated axle element intermediate said one coupling part and the proximate bracket means and including wheel-receiving means facing toward said one coupling part.

12. An axle assembly for mounting on a vehicle having a pair of supports spaced a fixed distance apart, comprising: first and second separate axle elements respectively having inner and outer ends and arranged in coaxial alinement to form an elongated axle structure having said outer ends spaced apart on the order of the spacing of the vehicle supports and said inner ends normally positioned in close proximity to each other at a junction intermediate the vehicle supports; said axle structure having a pair of separate, axially spaced bracket means thereon, one on each axle element, respectively adjacent to said outer ends for affixation to the respective supports to mount the axle structure on the vehicle; a wheel mount on the first axle element intermediate the proximate bracket means and said junction and having a wheel receiving portion concentric with the axle structure and facing toward said junction for the mounting and dismounting of a wheel having a central mounting opening; first and second flanges respectively on the inner ends of the first and second axle elements and cooperative means for selectively connecting or disconnecting said flanges to join or separate the axle elements at said junction, the diameter of at least the first flange being less than that of the wheel opening; and one of said axle elements being movable relative to the other upon disconnection of the flanges so that the inner ends of the axle elements may be separated sufficiently to enable the dismounted wheel to pass over said first flange and between the flanges for mounting or dismounting of the wheels.

13. A side-delivery rake comprising: a longitudinal main frame having front and rear ends and first and second longitudinal side members having their rear ends transversely spaced apart and alined to form first and second supports; axle means disposed transversely at the rear ends of the main frame and having first and second opposite ends projecting respectively laterally outwardly beyond the first and second supports; housing means rigidly affixed to the first support and enclosing and including first bearing means journaling the first end of the axle means; second bearing means secured to the second support and journaling the second end of the axle means; a first ground wheel on the axle means laterally inwardly of and closely adjacent to the first support; a second ground wheel on the axle means adjacent to the second support; first and second means cooperative between the wheels and the axle means for imparting rotation of the wheels to the axle; drive mechanism in the housing means and driven by the first end of the axle means and having an output member extending exteriorly of the housing means; a rotatable rake reel supported by the main frame and having a rotatable input member closely proximate to the output member; and relatively short drive means interconnecting the output and input members to drive the rake reel from the ground wheels.

14. The invention defined in claim 13, in which: the first wheel is demountably carried by the axle structure; and the axle structure comprises a pair of relatively separable axle elements joined by a selectively connectible and disconnectible coupling intermediate the first wheel and the second support to enable removal of the first wheel from the axle structure without detaching the housing means from the first support.

References Cited in the file of this patent

UNITED STATES PATENTS 2,637,967    McCandless et al. _____ May 12, 1953